(12) United States Patent
Tsao et al.

(10) Patent No.: US 8,018,418 B2
(45) Date of Patent: Sep. 13, 2011

(54) DATA SYNCHRONIZATION METHOD AND RELATED APPARATUS FOR A DISPLAY DEVICE

(75) Inventors: Wen-Yuan Tsao, Hsinchu County (TW); Che-Li Lin, Taipei (TW); Chi-Ming Yuan, Taipei (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 623 days.

(21) Appl. No.: 12/208,354

(22) Filed: Sep. 11, 2008

(65) Prior Publication Data

US 2009/0279649 A1   Nov. 12, 2009

(30) Foreign Application Priority Data

May 7, 2008  (TW) .............................. 97116808 A

(51) Int. Cl.
G09G 3/36  (2006.01)
(52) U.S. Cl. .............................. 345/98; 345/99; 345/204

(58) Field of Classification Search ............ 345/98, 345/99, 204
See application file for complete search history.

(56) References Cited

U.S. PATENT DOCUMENTS

2006/0001631 A1 *  1/2006  Yamazaki ............... 345/98
2006/0232541 A1 * 10/2006  Kudo et al. ............. 345/98

* cited by examiner

*Primary Examiner* — Amare Mengistu
*Assistant Examiner* — Premal Patel
(74) *Attorney, Agent, or Firm* — Winston Hsu; Scott Margo

(57) ABSTRACT

A data synchronization method for a transmitter of a display device includes utilizing a plurality of first signaling line sets to couple the transmitter and a plurality of receivers in a dedicated type manner, transmitting a synchronization signal to the plurality of receivers according to a transistor-to-transistor logic signal form, transmitting a synchronization start-up signal to the plurality of receivers via the plurality of first signaling line sets a first time later after the synchronization signal is transmitted, and then transmitting a data signal to the plurality of receivers via the plurality of first signaling line sets a second time later after the synchronization start-up signal is transmitted. The synchronization signal has a longer effective time than the synchronization start-up signal.

21 Claims, 10 Drawing Sheets

DATA SYNCHRONIZATION METHOD AND RELATED APPARATUS FOR A DISPLAY DEVICE

BACKGROUND OF THE INVENTION

1. Field of the Invention

The present invention relates to a synchronization method and related apparatus, and more particularly to a method and related device for synchronizing data reception in a display device.

2. Description of the Prior Art

In a flat display, a driving system consists of a timing controller, source drivers and gate drivers. The timing controller receives low voltage differential signals (LVDS), and thereby generates data content attempted to be displayed on a panel of the flat display. The data content is transmitted to the source drivers via at least one transmission interface, and the source drivers convert the received data content into analog voltage driving signals for driving the panel. Various types of the transmission interfaces are used between the timing controller and the source drivers. A multilevel differential signaling interface, a reduced swing differential signaling (RSDS) interface and a mini-low voltage differential signaling (mini-LVDS) interface are usually utilized for transmission of data and clock signals. The multilevel differential signaling interface operates with differential signals featuring multiple current intensities, and thereby the current intensity and direction are jointly used for encoding a signal type and related logic state. The multilevel differential signaling interface is considered a combination of multiple RSDS interfaces with different signal levels and thus can carry more data. A transistor-to-transistor logic (TTL) signaling interface is utilized for transmission of control signals, such as a synchronization signal or a polarity signal. In addition, the signal transmission manners include cascading, bus type and dedicated type signaling manners.

In the source driver, a synchronization signal provided by the timing controller controls the time of outputting the voltage driving signals. Please refer to FIGS. 1-3, which illustrate schematic diagrams of driving systems 10, 20, and 30 adopting different transmission architecture according to display devices of the prior art. The driving systems 10-30 include a timing controller TCON and source drivers CD(N−2), CD(N−1), and CD(N). The timing controller TCON transmits a synchronization signal SYNC in transistor-to-transistor logic (TTL) signal form and transmits a clock and data signals in differential signal form.

In the driving system 10, a synchronization signal SYNC and a clock signal CLK are both transmitted to the source drivers CD(N−2)-CD(N) in the bus type manner. The data signals DATA1-DATA3, each of which is a differential signaling pair, are transmitted in the dedicated type manner providing independent transmission lines for each data signal.

In the driving system 20, the synchronization signal SYNC is transmitted to the source driver CD(N−2)-CD(N) via a bus. The clock signal CLK is transmitted from a timing controller TCON to the source driver CD(N) in the cascading manner. Each of the data signal DATA1-DATA3 has two differential signaling pairs and are transmitted in the dedicated type manner providing four transmission lines for each data signal.

In the driving system 30, the synchronization signal SYNC is transmitted in the cascading manner. Clock signals CLK1-CLK3 are respectively transmitted to the source drivers CD(N−2)-CD(N) in the dedicated type manner. Data signals DATA1-DATA3 are also transmitted in the dedicated type manner, and each data signal has a differential signal pair.

In the driving systems 10-30, the synchronization signal SYNC functions to notify every source driver of the time the timing controller TCON transmits the first data signal. After the synchronization signal SYNC is transmitted, the timing controller TCON waits a predetermined amount of a half cycle period and then transmits the first data signal. On the other hand, the source drivers CD(N−2)-CD(N) wait the same amount of the half cycle period when receiving the corresponding synchronization signal SYNC, and then begin to receive signals. The first bit of the received signals is recognized as the first data signal bit.

For seeking users' satisfaction, the trend of the display moves toward large panel size, and therefore the signaling lines coupling to the timing controller and different source drivers have greater and greater line length difference. In this situation, the signaling lines corresponding to different source drivers work under heavily different loads, effecting rising and falling rates of transmission signals. In addition, the synchronization signal in TTL signal form has larger amplitude than the signals in differential signal form. As a result, the synchronization signal requires longer time to change its logic state.

Please refer to FIGS. 4 and 5, which illustrate schematic diagrams of received signal waveforms of source drivers CD(N−2)-CD(N) according to the driving systems 10, 20, and 30 used in a large-panel display. FIG. 4 shows the synchronization signal SYNC affected by load effect, whereas FIG. 5 shows the synchronization signal SYNC affected by the signaling line length. Only waveforms S2 and S3 in FIGS. 4 and 5 are different, and other elements are the same. In FIGS. 4 and 5, the source drivers CD(N−2)-CD(N) are configured to begin to receive a data signal DATA two half clock cycle periods later after receiving the synchronization signal SYNC. A waveform S1 is an ideal waveform of the synchronization signal SYNC, rising over a high level threshold, 0.7× the maximum level of the synchronization signal SYNC, within a half clock cycle period C1. In an ideal, correct operation, the source drivers CD(N−2)-CD(N) shall recognize a signal duration A as the first data bit. However, due to different skew rates caused by variant loads to the synchronization signal, the waveforms S2 and S3, corresponding to the source drivers CD(N−1) and CD(N), are delayed and thereby rise to the high level within clock durations C2 and C3 respectively. Therefore, the source drivers CD(N−1) and CD(N) mistakenly recognize signal durations B and C as the first data bit respectively.

In addition, the time the synchronization signal SYNC arrives the source drivers CD(N−2)-CD(N) could be greatly different due to great length difference among the corresponding signaling lines. The waveforms S2 and S3 reveal that the synchronization signal SYNC arrives the source drivers CD(N−1) and CD(N) within the clock durations C2 and C3. In this situation, the source drivers CD(N−1) and CD(N) also mistakenly recognize signal durations B and C as the first data bit respectively.

In the prior art, the synchronization signal for notifying the source drivers of the time to prepare for data reception has the TTL signal form, and is transmitted in the bus type or cascading manner. In addition, the length differences among the signaling lines are large enough so that the time difference that the synchronization signal arrives different source drivers can be larger than a half cycle period, thereby resulting in erroneous data reception in the source drivers.

SUMMARY OF THE INVENTION

The present invention provides a data synchronization method of a display device and related device for improving synchronization performance by embedding a synchronization start-up signal, functioning as the synchronization signal of the prior art, into differential signaling line arranged to dedicated type architecture.

The present invention discloses a data synchronization method for a transmitter of a display device. The data synchronization method includes utilizing a plurality of first signaling line pairs to couple the transmitter with a plurality of receivers of the display device in a dedicated type manner, transmitting a synchronization signal to the plurality of receivers according to a transistor-to-transistor logic signal form, transmitting a synchronization start-up signal to the plurality of receivers via the plurality of first signaling line pairs according to a differential signal form a first time later after transmitting the synchronization signal, and then transmitting a data signal to the plurality of receivers via the plurality of first signaling line pairs a second time later after transmitting the synchronization start-up signal. The synchronization signal has a longer effective time than the synchronization start-up signal.

The present invention further discloses a data synchronization method for a receiver of a display device. The data synchronization method includes switching from a data mode to a synchronization mode according to a synchronization signal, detecting and receiving a synchronization start-up signal during the synchronization mode, waiting a first time and then beginning to receive a data signal when the effective time of the synchronization start-up signal expires, and then switching from the synchronization mode to the data mode during a period of the third time according to a signal level change of the synchronization signal. The synchronization start-up signal has a shorter effective time than the synchronization signal.

The present invention further discloses a data synchronization device of a display device including a first signal output module, a second signal output module, a plurality of receivers and a plurality of first signaling line sets. The first signal output module outputs a synchronization signal according to a transistor-to-transistor logic signal form. The second signal output module outputs a synchronization start-up signal according to a differential signal form a first time later after the first signal output module outputs the synchronization signal, and further outputs a data signal a second time later after outputting the synchronization start-up signal. The plurality of receivers switches operating between a data mode and a synchronization mode according to the synchronization signal. Each of the plurality of receivers includes a first signal receiving module and a second signal receiving module. The first signal receiving module detects the synchronization signal. The second signal receiving module receives a synchronization start-up signal during the synchronization mode, and then begins to receive the data signal a third time, shorter than the second time, later after an effective time of synchronization start-up signal expires. The plurality of first signaling line sets couples the second signal output module with the second signal receiving modules of the plurality of receivers in a dedicated type manner, and is used for transmitting the synchronization start-up signal and the data signal. The synchronization signal has a longer effective time than the synchronization start-up signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
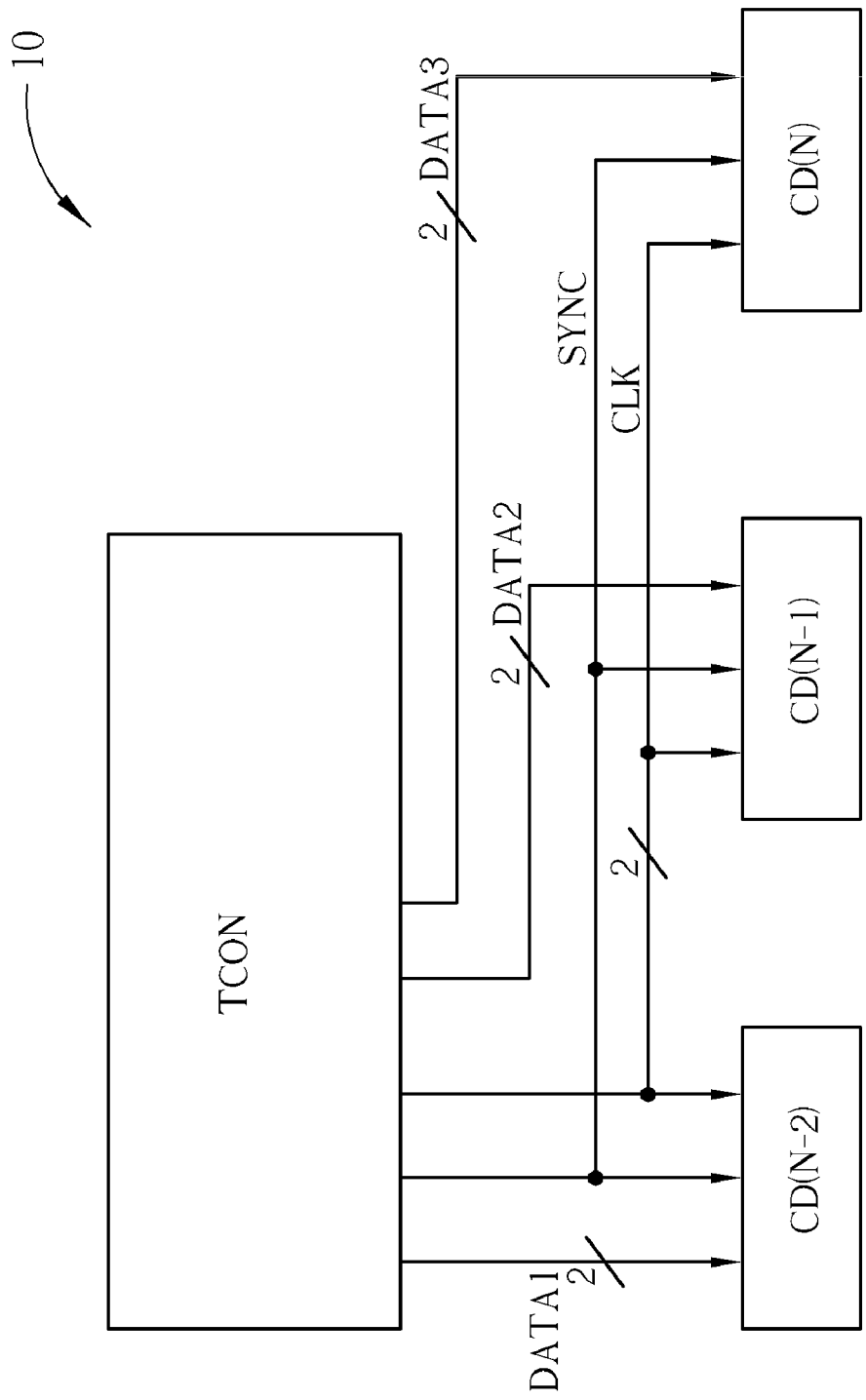
FIG. 1 illustrates a schematic diagram of a driving system according to the prior art.
Figure 2:
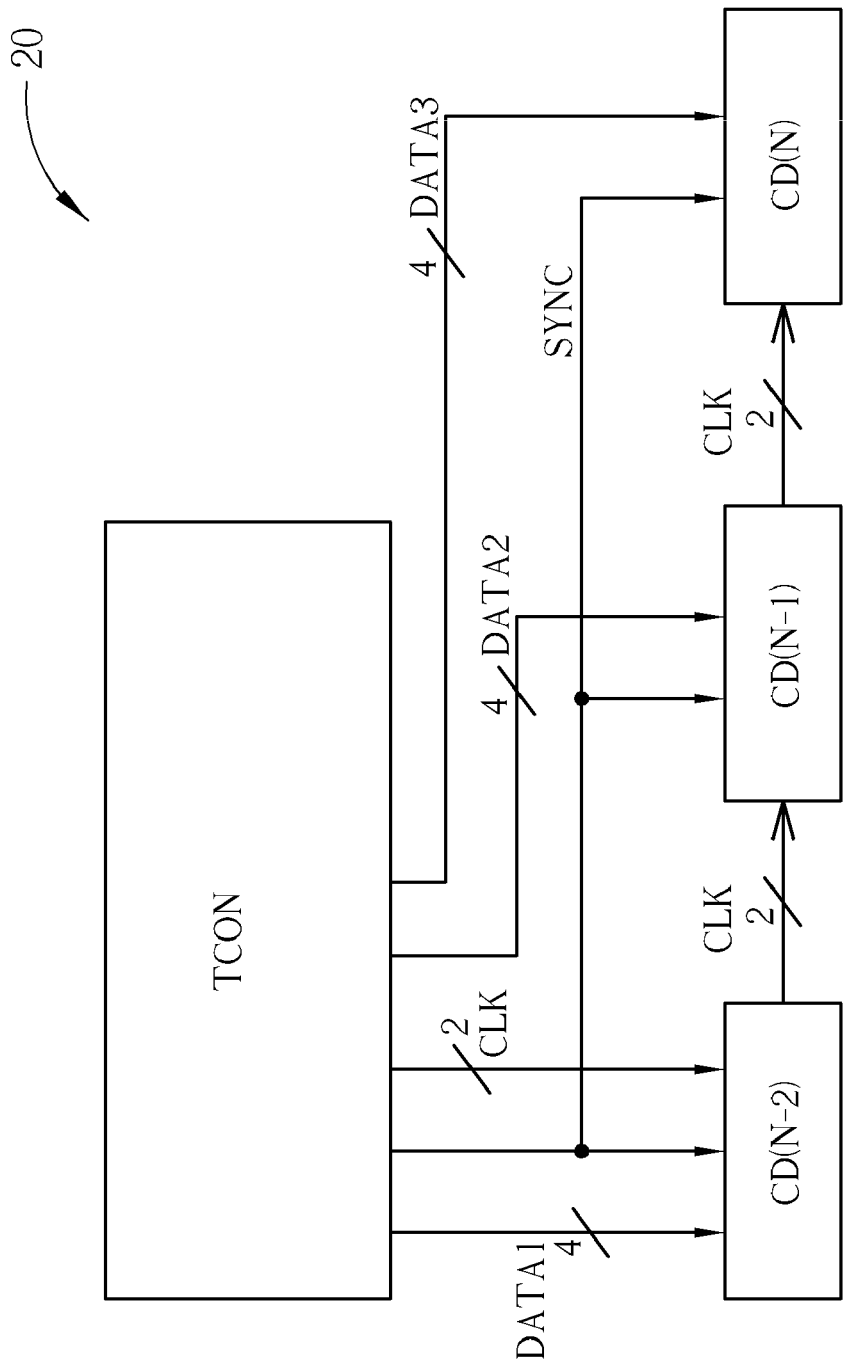
FIG. 2 illustrates a schematic diagram of a driving system according to the prior art.
Figure 3:
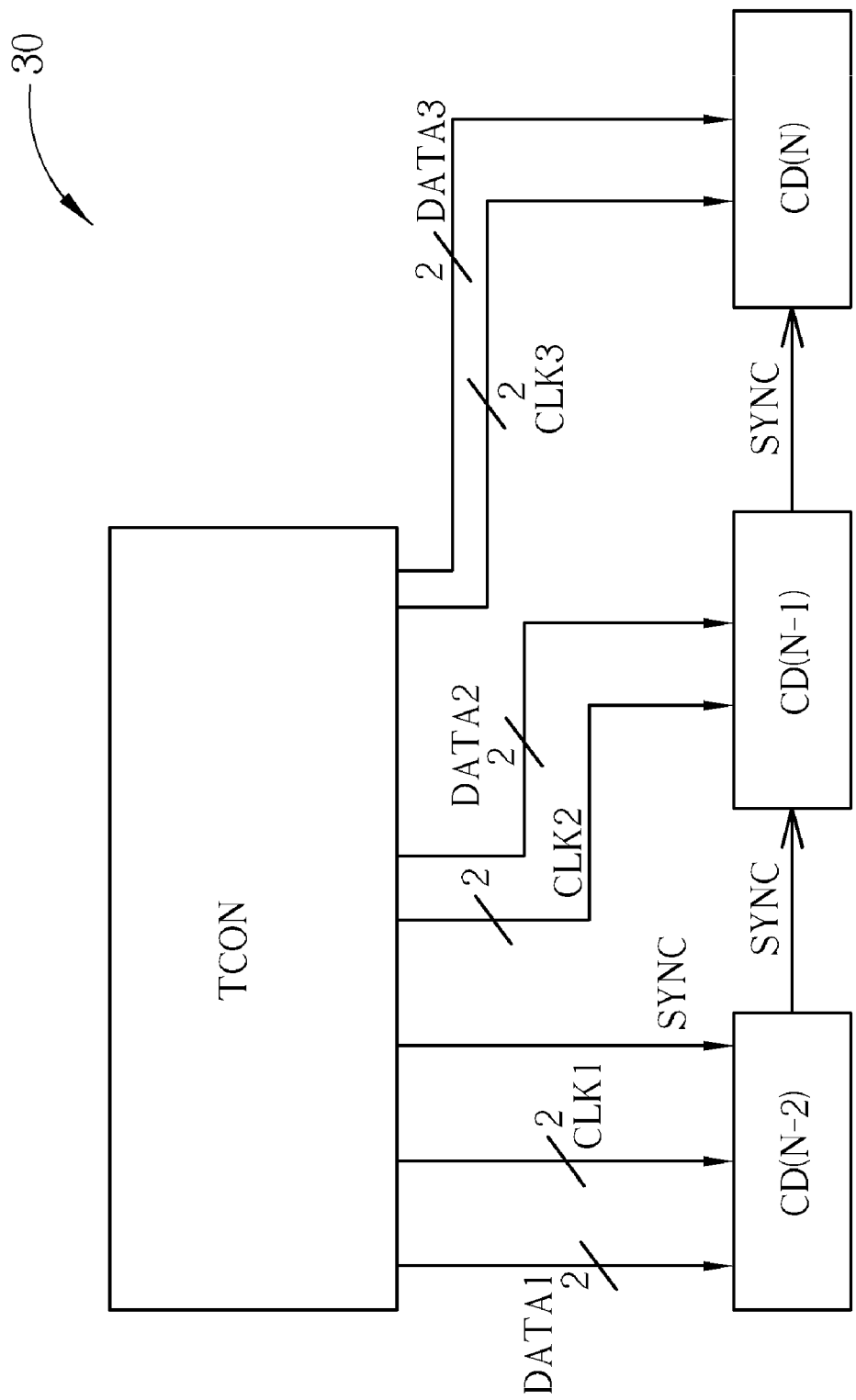
FIG. 3 illustrates a schematic diagram of a driving system according to the prior art.
Figure 4:
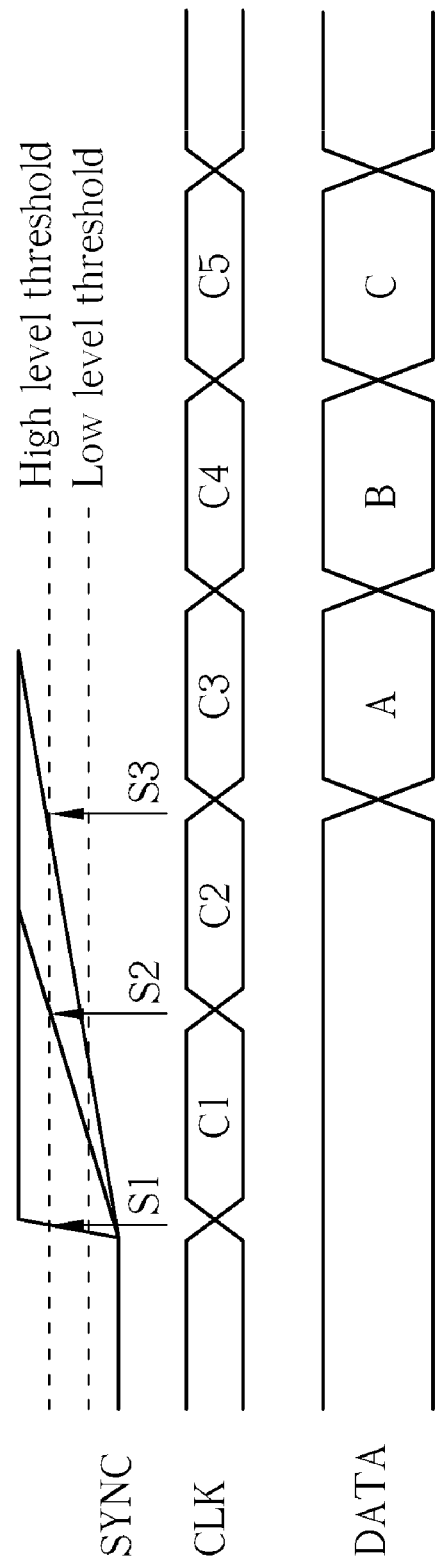
FIG. 4 illustrates a schematic diagram of received signal waveforms of source drivers according to the prior art.
Figure 5:
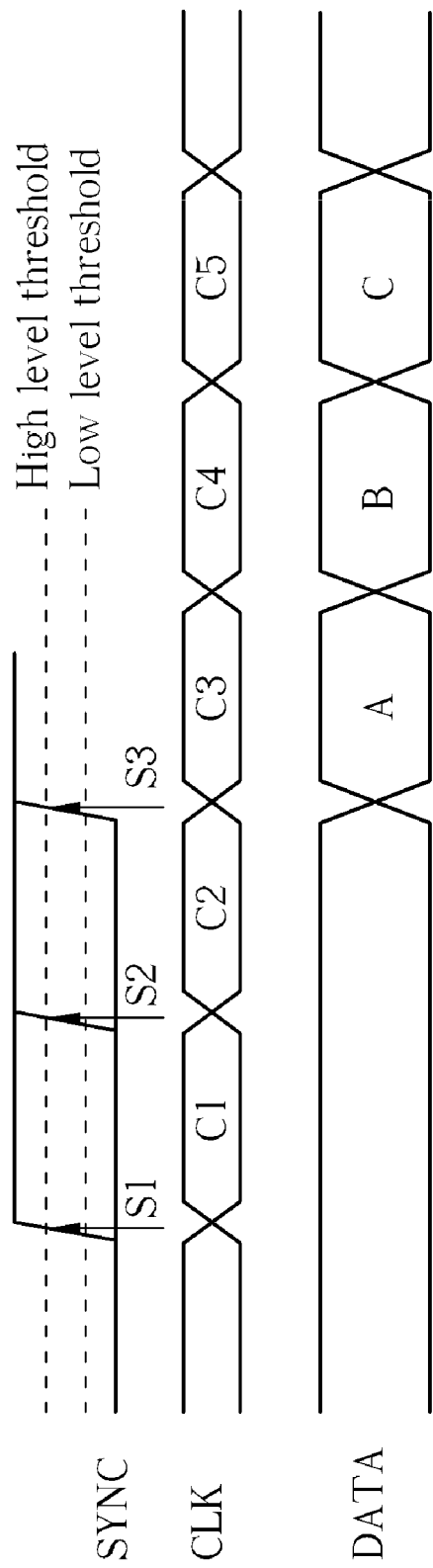
FIG. 5 illustrates a schematic diagram of received signal waveforms of source drivers according to the prior art.
Figure 6:
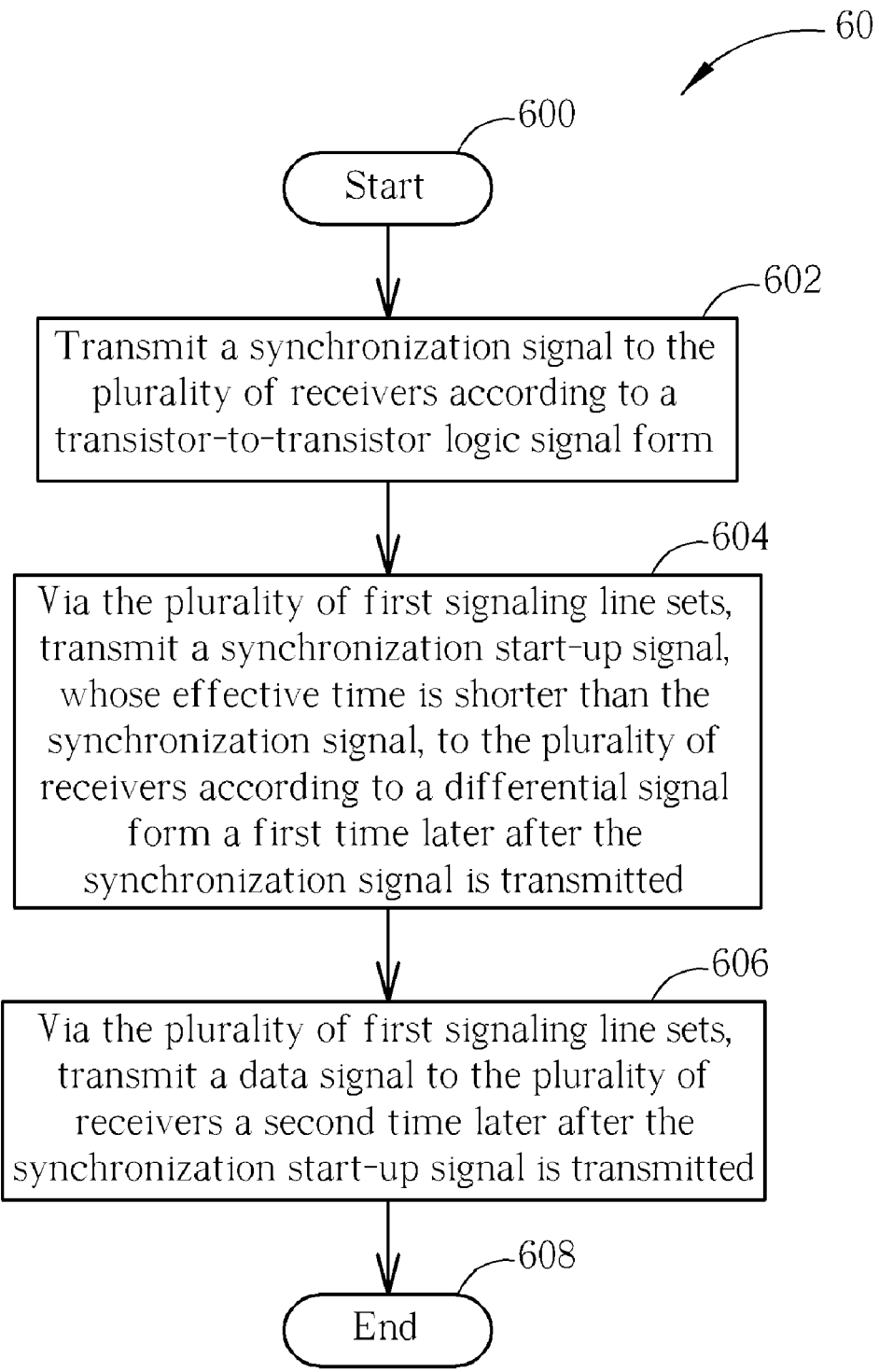
FIG. 6 illustrates a flowchart of a data synchronization process for a transmitter of a display device according to an embodiment of the present invention.

Please refer to FIG. 6, which illustrates a flowchart of a data synchronization process 60 for a transmitter of a display device according to an embodiment of the present invention. The transmitter is coupled with a plurality of receivers via a plurality of first signaling line sets in a dedicated type manner. In other words, each receiver uses one first signaling line set for receiving data from the transmitter. The data synchronization process 60 includes the following steps:

Step 600: Start.

Step 602: Transmit a synchronization signal to the plurality of receivers according to a transistor-to-transistor logic signal form.

Step 604: Via the plurality of first signaling line sets, transmit a synchronization start-up signal, whose effective time is shorter than the synchronization signal, to the plurality of receivers according to a differential signal form a first time later after the synchronization signal is transmitted.

Step 606: Via the plurality of first signaling line sets, transmit a data signal to the plurality of receivers a second time later after the synchronization start-up signal is transmitted.

Step 608: End.

According to the data synchronization process 60, the transmitter transmits the synchronization signal to all of the receivers in a bus type or cascading manner. The transmitter waits the first time and then transmits the synchronization start-up signal to give all of the receivers enough time to enter a synchronization mode from a data mode. The synchronization mode is used for the plurality of receivers to receive the synchronization start-up signal, which functions to notify the plurality of receivers of the time the transmitter transmits the first data signal. After the synchronization start-up signal is transmitted, the transmitter waits the second time and then transmits the data signal to the plurality of receivers via the plurality of first signaling line sets. The effective time of the synchronization signal expires during the second time so as to trigger the plurality of receivers to switch from the synchronization mode to the data mode for reception of the data signal.

Preferably, the transmitter encodes the data and the synchronization start-up signals according to the differential signal form in advance. Take a reduced swing differential signal (RSDS) form for example. The transmitter can encode the synchronization start-up signal to '1', and all other types of signals, hereinafter called non synchronization start-up signals, to '0'. As for the data signal, the data logic states are decoded to '1' or '0'.

Take a multilevel differential signal form for another example. The transmitter can encode the synchronization start-up signal to '01', and the non synchronization start-up signals to '00', '11', or '10'. The data signals transmitted according to the multilevel differential signal form are allowed to include different type of definitions, and all the code symbols (ex. '00' and '11') can be used to encode both the signal type and logic states. Preferably, the transmitter further transmits an RSDS clock signal to the plurality of receivers in the bus type, cascading, or dedicated type manner. In this situation, the first time, the second time, signal lengths of the synchronization signal and the synchronization start-up signal are set to multiples of a half cycle period of the clock signal.

Figure 7:
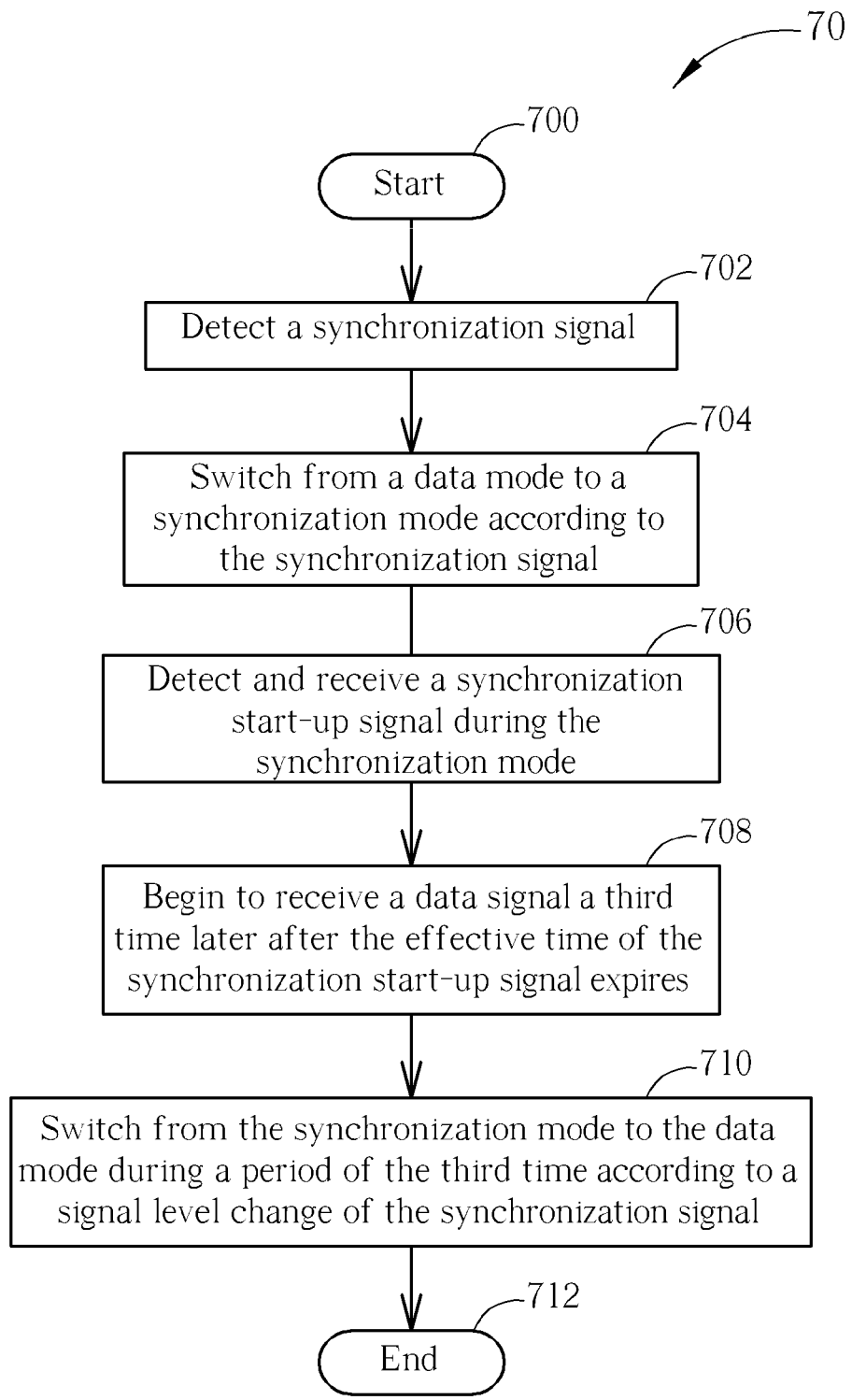
FIG. 7 illustrates a flowchart of a data synchronization process for a receiver of a display device according to an embodiment of the present invention.

To cooperation with the data synchronization process 60 of the transmitter, each receiver operates according to a specific process. Please refer to FIG. 7, which illustrates a flowchart of a data synchronization process 70 for a receiver of a display device according to an embodiment of the present invention. The data synchronization process 70 includes the following steps:

Step 700: Start.

Step 702: Detect a synchronization signal.

Step 704: Switch from a data mode to a synchronization mode according to the synchronization signal.

Step 706: Detect and receive a synchronization start-up signal during the synchronization mode.

Step 708: Begin to receive a data signal a third time later after the effective time of the synchronization start-up signal expires.

Step 710: Switch from the synchronization mode to the data mode during a period of the third time according to a signal level change of the synchronization signal.

Step 712: End.

According to the data synchronization process 70, the receiver switches from the data to the synchronization mode when the synchronization signal is detected. During the synchronization mode, the receiver decodes signals on the corresponding first signaling line set to detect the synchronization start-up signal. When the RSDS form is used in the data synchronization process 60, the receiver correspondingly starts to receive the synchronization start-up signal as the decoding result is '1', and the effective time of the synchronization start-up signal expires when the decoding result becomes '0'. When the multilevel differential signal form is used in the data synchronization process 60, the synchronization start-up signal is detected and begins to be received as the decoding result is '01', and the effective time thereof expires when the decoding result changes to other code symbols, such as '11' or '00'. The receiver begins to receive the data signal a third time later after the synchronization start-up signal terminates. Within the third time, the receiver switches from the synchronization to the data mode when a signal level change occurs in the synchronization signal, such as a change from a high to a low signal level or vice versa, to prepare for reception of the data signal, such as internal circuit setting. When the third time expires, all decoded code symbols (ex. '1', '0', '01' or '10') are recognized as the data signal, and used for determination of a data signal type and related logic state. Preferably, the third time is time difference between the second time and the effective time of the synchronization start-up signal.

Figure 8:
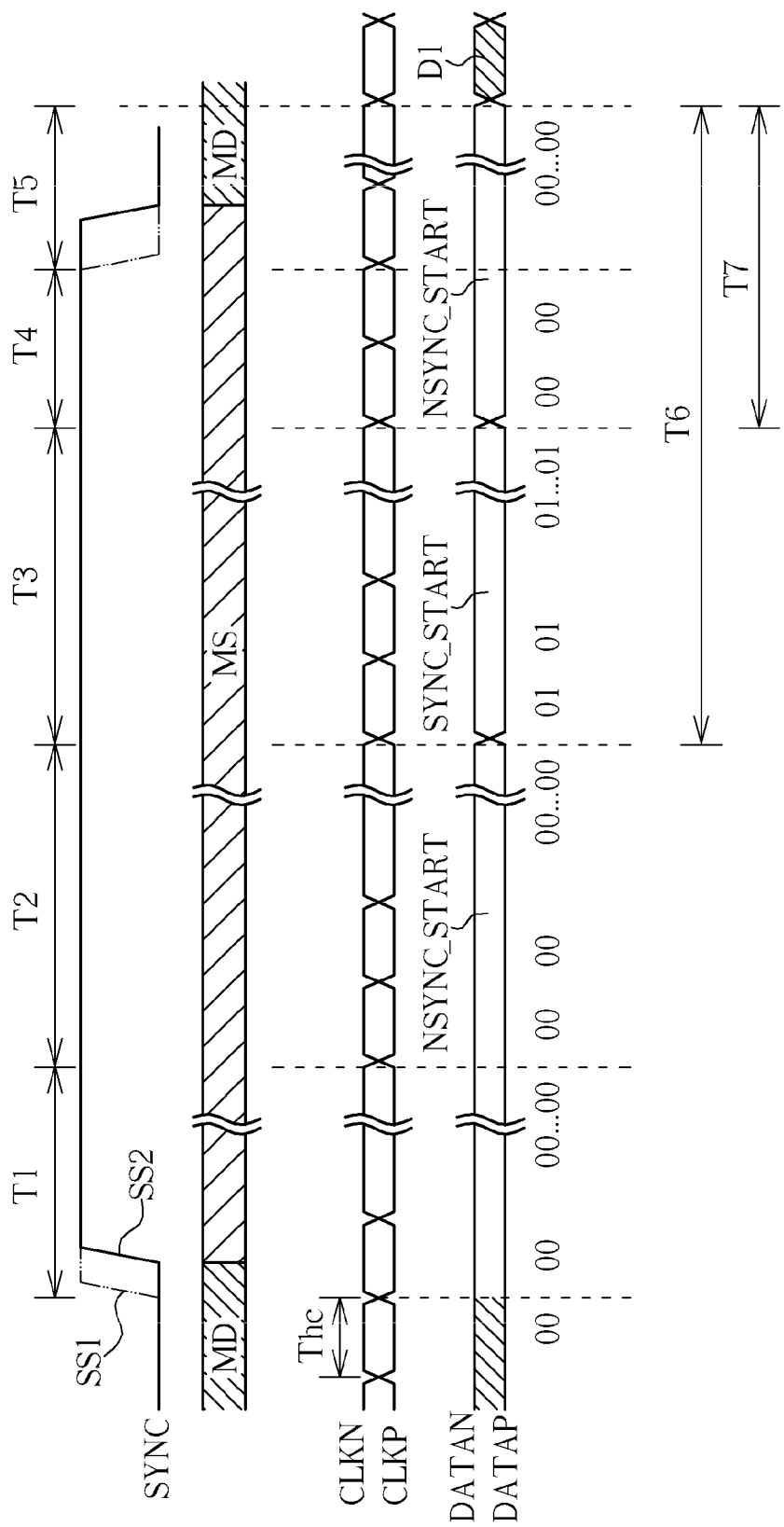
FIG. 8 illustrates a schematic diagram of signal waveforms and related communications protocol for a timing controller and a source driver according to an embodiment of the present invention.

Preferably, the transmitter is realized in a timing controller, whereas receivers are realized in source drivers. Please refer to FIG. 8, which illustrates a schematic diagram of signal waveforms and related communications protocol for a timing controller and a source driver according to an embodiment of the present invention. The associated signals shown from top to bottom are a synchronization signal SYNC, a protocol state of the source driver, a clock signal on differential signaling lines CLKN and CLKP, a signal on a first signaling line set including first signaling lines DATAN and DATAP, and corresponding encoded code symbols of the signal of the first signaling line set. In the synchronization signal SYNC, a waveform SS1 is an output waveform of the timing controller, whereas a waveform SS2 is a receiving waveform of the source driver. Those skills in the art know, as shown in FIG. 8, that a skew occurs between the waveforms SS1 and SS2 due to different lengths of singling lines or variation of the transmitter or chip thereof. A time Thc of the clock signal represents a half clock cycle period, and times T1-T7 are all multiples of the time Thc. For the timing controller side, a non synchronization start-up signal NSYNC_START encoded to '00' is transmitted during the times (T1+T2) and (T4+T5). A synchronization start-up signal SYNC_START encoded to '01' is transmitted during the time T3. For the source driver side, a signal level of the waveform SS2 rises to a high level, which is higher than (0.7× a maximum level of the waveform SS2), within the time T1, and thereby the source driver switches from a data mode MD to a synchronization mode MS. In other words, all the source drivers coupled to the timing controller finishes internal circuit setting within the time T1 to prepare for reception of the synchronization start-up signal SYNC_START. Within the time T5, the signal level of the waveform SS2 falls to a low level, which is lower than (0.3× the maximum level), and thereby triggers the source driver to switch from the synchronization mode MS back to the data mode MD to prepare for reception of a data signal. The durations of the time T2 and T4 are used for the source driver to detect the non synchronization start-up signal NSYNC_START on the first signaling lines DATAN and DATAP respectively. The time T3 is used for the source driver to detect the synchronization start-up signal SYNC_START. The source driver begins to receive a data signal D1 a time T7 later after the synchronization start-up signal SYNC_START terminates.

As can be seen from FIG. 8, a time (T1+T2+T3+T4) is the effective time of the synchronization signal SYNC. The time T3 is the effective time of the synchronization start-up signal SYNC_START. A time (T1+T2) is the first time of the data synchronization process 60, whereas a time T6 as well as (T3+T4+T5) is the second time, and a time T7 is the third time. Besides, the data signal D1 is the first data signal received by the source driver. Since the source drivers uses independent first signaling lines DATAN and DATAP as known dedicated type architecture and the different signal thereof has a smaller amplitude than the synchronization signal SYNC, the time difference of receiving the data signal D1 among the source drivers can be neglected. Furthermore, the synchronization signal SYNC is used as a signal mask herein to ensure the source driver does not mistakenly determines the synchronization start-up signal SYNC_START to be a data signal or the data signal D1 to be the non synchronization start-up signal NSYNC_START. Please note that, according to the transmission line architecture and the internal system of the source driver, those skills in the art could adjust lengths of the time T1-T5. For example, the time T2 and T4 can be eliminated.

Figure 9:
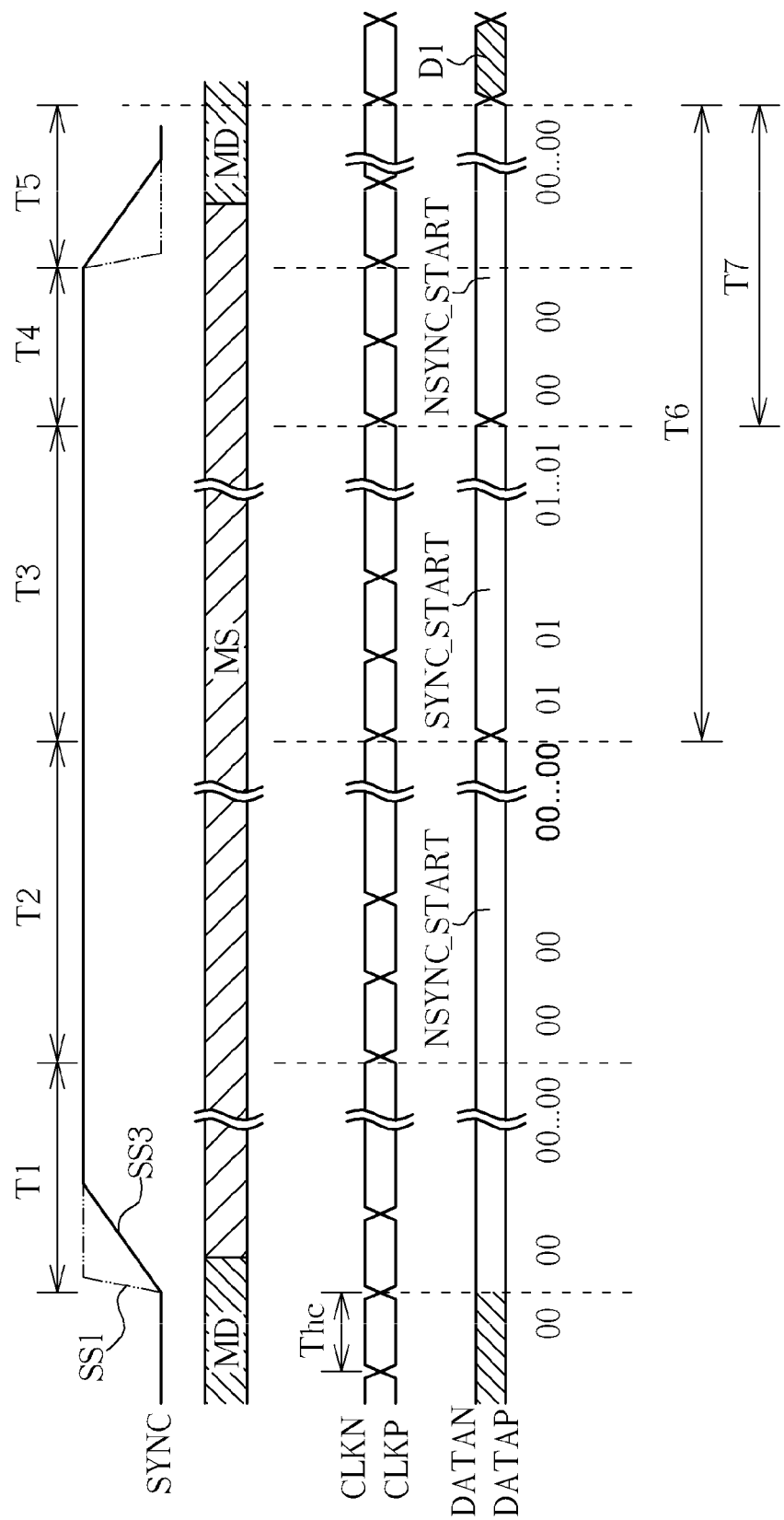
FIG. 9 illustrates a schematic diagram of signal waveforms and related communications protocol for a timing controller and a source driver according to an embodiment of the present invention.

Please refer to FIG. 9, which illustrates a schematic diagram of signal waveforms and related communications protocol for a timing controller and source drivers according to another embodiment of the present invention. In FIG. 9, a waveform SS3 of the synchronization signal SYNC is the receiving waveform of the source driver, and has a delay due to a slew-rate characteristic of the signaling lines. Within the time T1, a signal level of the waveform SS3 rises to a high signal level, and the source driver switches from the data mode MD to the synchronization mode MS. Within the time T5, the signal level of the waveform SS3 falls to a low signal level, and the source driver thereby switches from the synchronization mode MS to the data mode MD. The other waveforms and elements in FIG. 9 and operating principles thereof are the same as those in FIG. 8. Thus, detailed operation description is omitted herein. Please note that those skills in the art could adjust lengths of the time T1-T5 of FIG. 9. For example, the time T2 and T4 can be eliminated.

Figure 10:
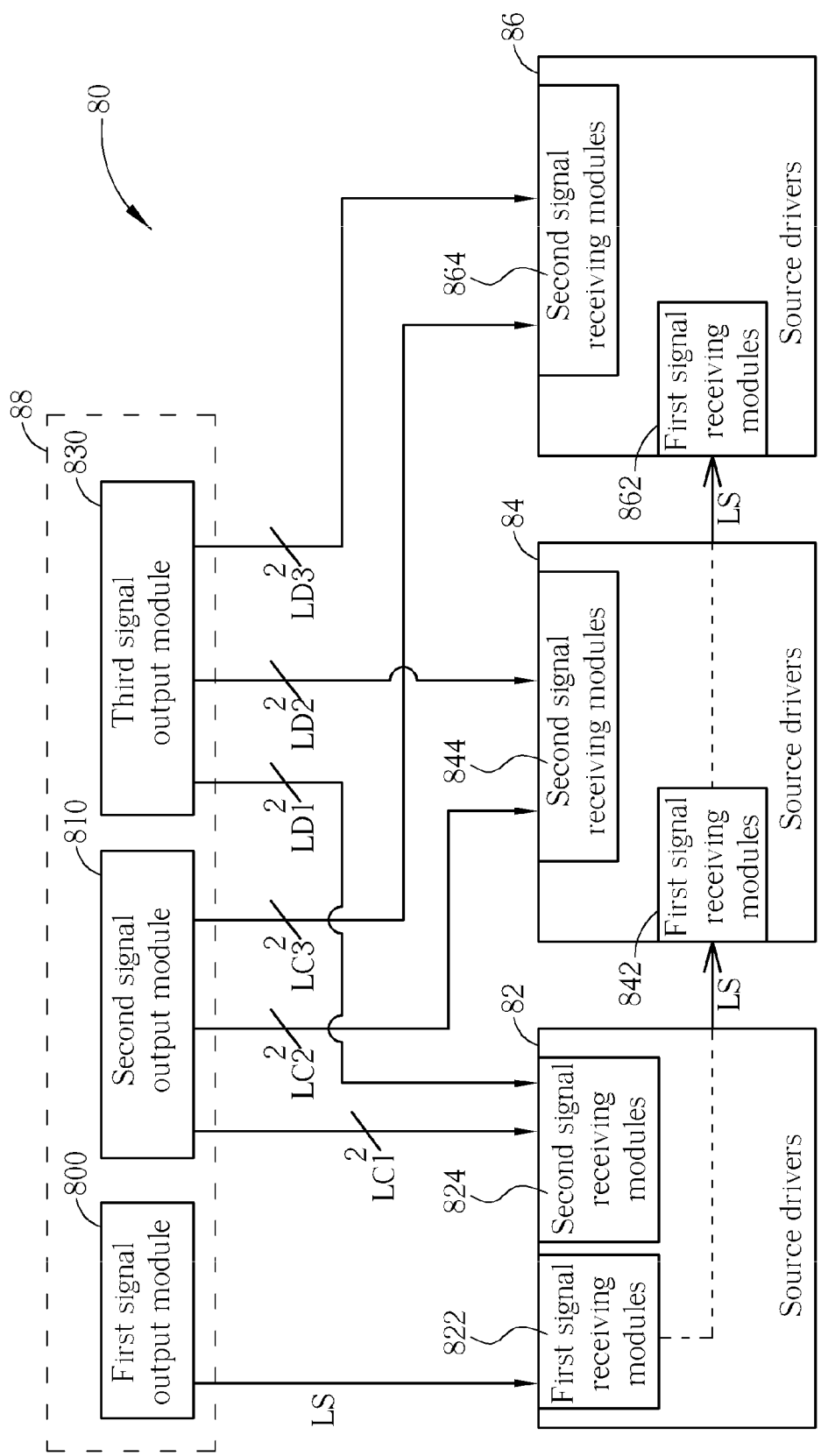
FIG. 10 illustrates a schematic diagram of a data synchronization device according to an embodiment of the present invention.

Please refer to FIG. 10, which illustrates a schematic diagram of a data synchronization device 80 according to an embodiment of the present invention. The data synchronization device 80 is utilized for realizing the data synchronization processes 60 and 70, and includes a first signal output module 800, a second signal output module 810, a third signal output module 830, source drivers 82, 84 and 86, first signaling line sets LC1-LC3, a second signaling line LS, and third signaling line sets LD1-LD3. The first signal output module 800, the second signal output module 810 and the third signal output module 830 are installed inside a timing controller 88. Via the second signaling line LS, the first signal output module 800 transmits a synchronization signal in TTL form to the source drivers 82, 84 and 86 in the cascading manner. The second signal output module 810 outputs a synchronization start-up signal via the first signaling line sets LC1-LC3 in the dedicated type manner a first time later after the first signal output module 800 transmits the synchronization signal. Furthermore, the second signal output module 810 outputs a data signal a second time after the synchronization start-up signal is outputted. The third signal output module 830 transmits a clock signal via the third signaling line sets LD1-LD3 in the dedicated type manner.

The source drivers 82-86 switch between the data and the synchronization modes according to the synchronization signal, and include first signal receiving modules 822, 842 and 862, and second signal receiving modules 824, 844 and 864. The first signal receiving modules 822, 842 and 862 are used for detecting the synchronization signal, while the second signal receiving modules 824, 844 and 864 are used for receiving the synchronization start-up signal during the synchronization modes of the corresponding source drivers, and begins to receive the data signal a third time later after the synchronization start-up signal terminates. The first, second, and third times used for the data synchronization device 80 are the same as those in the data synchronization processes 60 and 70. The detailed operations of the data synchronization device 80 are referred by the data synchronization processes 60 and 70 and therefore omitted here.

Please note that those skills in the art can embed different types of signals into the data signal of the abovementioned embodiments, such as pixel data, system control signals or setting signals of display device.

In summary, the embodiments of the present invention embed the signal, used for notifying the source drivers of the time to receive the first data bit, into the differential signaling lines. The synchronization signal of the prior art is reformed to be a signal mask in the embodiments of the present invention, so as to prevent the source drivers from mistakenly determining the signal types of the differential signals. Therefore, with dedicated type transmission and the smaller amplitude of the differential signals, the present invention can ensure the source drivers to accurately and synchronously receive data.

Those skilled in the art will readily observe that numerous modifications and alterations of the device and method may be made while retaining the teachings of the invention.

What is claimed is:

1. A data synchronization method for a transmitter of a display device, the data synchronization method comprising:
   utilizing a plurality of first signaling line sets to couple the transmitter with a plurality of receivers of the display device in a dedicated type manner;
   transmitting a synchronization signal to the plurality of receivers according to a transistor-to-transistor logic signal form;
   via the plurality of first signaling line sets, transmitting a synchronization start-up signal to the plurality of receivers according to a differential signal form a first time later after transmitting the synchronization signal; and
   via the plurality of first signaling line sets, transmitting a data signal to the plurality of receivers a second time later after transmitting the synchronization start-up signal;
   wherein the synchronization signal has a longer effective time than the synchronization start-up signal.

2. The data synchronization method of claim 1, wherein the data signal is generated from pixel data, system control signals or setting signals of the display device.

3. The data synchronization method of claim 1, wherein the step of transmitting the synchronization signal to the plurality of receivers according to the transistor-to-transistor logic signal form comprises:
   transmitting the synchronization signal to the plurality of receivers in a bus type or cascading manner according to the transistor-to-transistor logic signal.

4. The data synchronization method of claim 1 further comprising:
   encoding the synchronization start-up signal and the data signal according to the differential signal form.

5. The data synchronization method of claim 1 further comprising:
   transmitting a clock signal to the plurality of receivers in a bus type, cascading, or dedicated type manner.

6. The data synchronization method of claim 5, wherein the first time, the second time, a time length of the synchronization signal, and a time length of the synchronization start-up signal are multiples of a half cycle period of the clock signal.

7. A data synchronization method for a receiver of a display device, the data synchronization method comprising:
   switching from a data mode to a synchronization mode according to a synchronization signal;
   detecting and receiving a synchronization start-up signal during the synchronization mode, the synchronization start-up signal having a shorter effective time than the synchronization signal;
   beginning to receive a data signal a first time later after the effective time of the synchronization start-up signal expires; and
   switching from the synchronization mode to the data mode during a period of the first time according to a signal level change of the synchronization signal.

8. The data synchronization method of claim 7 further comprising:
  decoding the synchronization start-up signal and the data signal.

9. The data synchronization method of claim 7 further comprising:
  receiving a clock signal.

10. The data synchronization method of claim 9, wherein the first time, a time length of the synchronization signal, and a time length of the synchronization start-up signal are multiples of a half cycle period of the clock signal.

11. The data synchronization method of claim 7, wherein the data signal is generated from pixel data, system control signals or setting signals of the display device.

12. A data synchronization device of a display device, the data synchronization device comprising:
  a first signal output module for outputting a synchronization signal according to a transistor-to-transistor logic signal form;
  a second signal output module for outputting a synchronization start-up signal according to a differential signal form a first time later after the first signal output module outputs the synchronization signal, and outputting a data signal a second time later after outputting the synchronization start-up signal;
  a plurality of receivers for switching between a data mode and a synchronization mode according to the synchronization signal, each of the plurality of receivers comprising:
    a first signal receiving module for detecting the synchronization signal; and
    a second signal receiving module for receiving a synchronization start-up signal during the synchronization mode, and beginning to receive the data signal a third time, shorter than the second time, later after an effective time of synchronization start-up signal expires; and
  a plurality of first signaling line sets coupling the second signal output module with the second signal receiving modules of the plurality of receivers in a dedicated type manner, for transmitting the synchronization start-up signal and the data signal;
  wherein the synchronization signal has a longer effective time than the synchronization start-up signal.

13. The data synchronization device of claim 12 further comprising a second signaling line coupling the first signal output module with the first signal receiving modules of the plurality of receivers in a bus type or cascading manner, for transmitting the synchronization signal.

14. The data synchronization device of claim 12, wherein the second signal output module further encodes the synchronization start-up signal and the data signal according to the differential signal form.

15. The data synchronization device of claim 12 further comprising a third signal output module for outputting a clock signal to the plurality of receivers.

16. The data synchronization device of claim 15 further comprising a third signaling line coupling the third signal output module with the plurality of receivers in a bus type, cascading, or dedicated type manner, for transmitting the clock signal.

17. The data synchronization device of claim 15, wherein the third signal output module is installed in a timing controller of the display device.

18. The data synchronization device of claim 15, wherein the first time, the second time, the third time, a time length of the synchronization signal, and a time length of the synchronization start-up signal are multiples of a half cycle period of the clock signal.

19. The data synchronization device of claim 12, wherein the first signal output module and the second signal output module are installed in a timing controller of the display device.

20. The data synchronization device of claim 12, wherein the plurality of receivers are source drivers of the display device.

21. The data synchronization device of claim 12, wherein the data signal is generated from pixel data, system control signals or setting signals of the display device.

* * * * *